United States Patent
Iida et al.

(10) Patent No.: US 8,939,559 B2
(45) Date of Patent: Jan. 27, 2015

(54) NON-AQUEOUS CLEANING LIQUID AND CLEANING METHOD

(71) Applicant: Seiko Epson Corporation, Tokyo (JP)

(72) Inventors: Keiji Iida, Higashichikuma-gun (JP); Kenichiro Kubota, Shiojiri (JP); Akihito Sao, Matsumoto (JP); Makoto Nagase, Shiojiri (JP); Maki Ito, Shiojiri (JP)

(73) Assignee: Seiko Epson Corporation (JP)

( * ) Notice: Subject to any disclaimer, the term of this patent is extended or adjusted under 35 U.S.C. 154(b) by 2 days.

(21) Appl. No.: 13/688,973

(22) Filed: Nov. 29, 2012

(65) Prior Publication Data

US 2013/0141501 A1 Jun. 6, 2013

(30) Foreign Application Priority Data

Dec. 5, 2011 (JP) ................. 2011-265507

(51) Int. Cl.
*B41J 2/01* (2006.01)
*C11D 7/50* (2006.01)
*C11D 3/40* (2006.01)
*C11D 11/00* (2006.01)
*C09D 9/00* (2006.01)

(52) U.S. Cl.
CPC ............... *C11D 7/5022* (2013.01); *C11D 3/40* (2013.01); *C11D 11/0041* (2013.01); *C09D 9/005* (2013.01)
USPC ............................................ 347/85

(58) Field of Classification Search
USPC ............... 347/54, 56, 63, 65, 68, 85
See application file for complete search history.

(56) References Cited

U.S. PATENT DOCUMENTS

| | | | | |
|---|---|---|---|---|
| 5,952,051 A | * | 9/1999 | Asano et al. | ................. 427/362 |
| 5,984,450 A | * | 11/1999 | Becker et al. | ................. 347/24 |
| 6,062,678 A | * | 5/2000 | Ishinaga et al. | ................. 347/62 |
| 6,595,617 B2 | * | 7/2003 | Sharma et al. | ................. 347/28 |
| 2004/0085390 A1 | * | 5/2004 | Itano et al. | ................. 347/35 |
| 2004/0183874 A1 | | 9/2004 | Toyoda et al. | |
| 2004/0217127 A1 | | 11/2004 | Kimura et al. | |
| 2007/0225185 A1 | | 9/2007 | Kasai | |
| 2008/0273061 A1 | * | 11/2008 | Tsuchiya et al. | ................. 347/55 |
| 2009/0246480 A1 | * | 10/2009 | Saito | ................. 428/195.1 |

FOREIGN PATENT DOCUMENTS

JP 2004-276991 A 10/2004

(Continued)

OTHER PUBLICATIONS

Computer-generated translation of JP 2010-260296, published on Nov. 2010.*
English_Abstract_of_JP2004-276991A, published on Oct. 2004.

(Continued)

*Primary Examiner* — Huan Tran
(74) *Attorney, Agent, or Firm* — Harness, Dickey & Pierce, P.L.C.

(57) ABSTRACT

A non-aqueous cleaning liquid which is used for cleaning an ink flow path, through which a non-aqueous ink is circulated, in an ink jet recording apparatus including the ink flow path and with which a container composed of polyolefin is filled, includes a pigment and an organic solvent. In the non-aqueous cleaning liquid, a content of the pigment is 0.001% by mass to 0.5% by mass and an average particle size (d50) of the pigment is 10 nm to 500 nm.

12 Claims, 3 Drawing Sheets

(56) References Cited

FOREIGN PATENT DOCUMENTS

| | | | | |
|---|---|---|---|---|
| JP | 2004-306466 A | 11/2004 | | |
| JP | 2007-254550 A | 10/2007 | | |
| JP | 2010-260296 | * 11/2010 | ............... | B41J 2/165 |
| JP | 2011-140556 A | 7/2011 | | |

OTHER PUBLICATIONS

English_Abstract_of_JP2004-306466A, published on Nov. 2004.
English_Abstract_of_JP2007-254550A, published on Oct. 2007.
English_Abstract_and_Machine Translation_of_JP2011-140556A_MT, published on Jul. 2011.

* cited by examiner

NON-AQUEOUS CLEANING LIQUID AND CLEANING METHOD

The entire disclosure of Japanese Application No.: 2011-265507 filed on Dec. 5, 2011 is expressly incorporated by reference herein.

BACKGROUND

1. Technical Field

The present invention relates to a non-aqueous cleaning liquid which is used for cleaning an ink flow path and a method of cleaning an ink flow path using the same.

2. Related Art

In the related art, a so-called ink jet recording apparatus is known in which images and characters are recorded using fine ink droplets which are discharged from nozzles of an ink jet recording head. In such an ink jet recording apparatus, an ink flow path for circulating ink is provided, for example, a flow path for supplying ink from an ink container containing ink to an ink jet recording head, or a flow path for circulating ink to a nozzle opening in an ink jet recording head.

In the ink jet recording apparatus, when clogging of an ink flow path occurs, ink supply may be inhibited or ink discharge may fail. In order to solve such problems, for example, a cleaning liquid is circulated inside an ink flow path (refer to JP-A-2007-254550).

An ink flow path is filled with ink again after being cleaned by a cleaning liquid. Therefore, in order to easily replace a cleaning liquid and ink, a configuration in which both of them contain similar components is known, for example, components included in a cleaning liquid and a main solvent included in ink are the same (refer to JP-A-2011-140556). From this point of view, when an ink flow path is cleaned in an ink jet recording apparatus using a non-aqueous ink including an organic solvent as a major component, there are many cases in which a non-aqueous cleaning liquid containing the same organic solvent as that of a non-aqueous ink is used.

There are many cases in which the above-described cleaning liquid is stored in a container before being supplied to an ink flow path of an ink jet recording apparatus. In such a container for storing a cleaning liquid, a polyolefin film may be used for a member in contact with the cleaning liquid.

However, when a non-aqueous cleaning liquid is used, there are cases where an organic solvent included therein dissolves in the polyolefin film and foreign materials in a container are generated. The foreign materials generated in the container flow into an ink flow path along with the cleaning liquid, which may cause defects such as nozzle clogging and may inhibit the cleaning of the ink flow path. In addition, when a polyolefin-based material is used for an ink flow path, the same problems as those generated in the container occur, which may inhibit the cleaning of the ink flow path.

SUMMARY

An advantage of some aspects of the invention is to provide as non-aqueous cleaning liquid having an excellent cleaning property for an ink flow path.

The invention can be realized in the following forms or application examples.

APPLICATION EXAMPLE 1

According to an aspect of the invention, there is provided a non-aqueous cleaning liquid which is used for cleaning an ink flow path, through which a non-aqueous ink is circulated, in an ink jet recording apparatus including the ink flow path and with which a container composed of polyolefin is filled, the non-aqueous cleaning liquid including a pigment and an organic solvent.

According to the non-aqueous cleaning liquid of Application Example 1, foreign materials generated when polyolefin dissolves therein can be suppressed and thus a cleaning property of an ink flow path is excellent.

APPLICATION EXAMPLE 2

In the non-aqueous cleaning liquid according to Application Example 1, a content of the pigment is 0.001% by mass to 0.5% by mass.

APPLICATION EXAMPLE 3

In the non-aqueous cleaning liquid according to Application Example 1 or 2, an average particle size (d50) of the pigment is 10 nm to 500 nm.

APPLICATION EXAMPLE 4

In the non-aqueous cleaning liquid according to any one of Application Examples 1 to 3, the pigment is an organic pigment.

APPLICATION EXAMPLE 5

According to another aspect of the invention there is provided a method of cleaning an ink flow path, through which a non-aqueous ink is circulated, in an ink jet recording apparatus including the ink flow path, the method including circulating the non-aqueous cleaning liquid according to any one of Application Examples 1 to 4 through the ink flow path, in which the ink flow path includes a region which has a cross-sectional surface area of 100 $\mu m^2$ to 1000 $\mu m^2$ perpendicular to a direction of circulation of the non-aqueous ink.

APPLICATION EXAMPLE 6

In the cleaning method according to Application Example 5, the region is a nozzle opening, and the diameter of the nozzle opening is 15 $\mu m$ to 25 $\mu m$.

APPLICATION EXAMPLE 7

In the cleaning method according to Application Example 5, the region is an ink supply path which is a part of the ink flow path, the ink supply path has a quadrilateral shape in a cross-section perpendicular to a circulation direction of the non-aqueous ink, and the length of a shortest side of the quadrilateral shape is 15 $\mu m$ to 25 $\mu m$.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
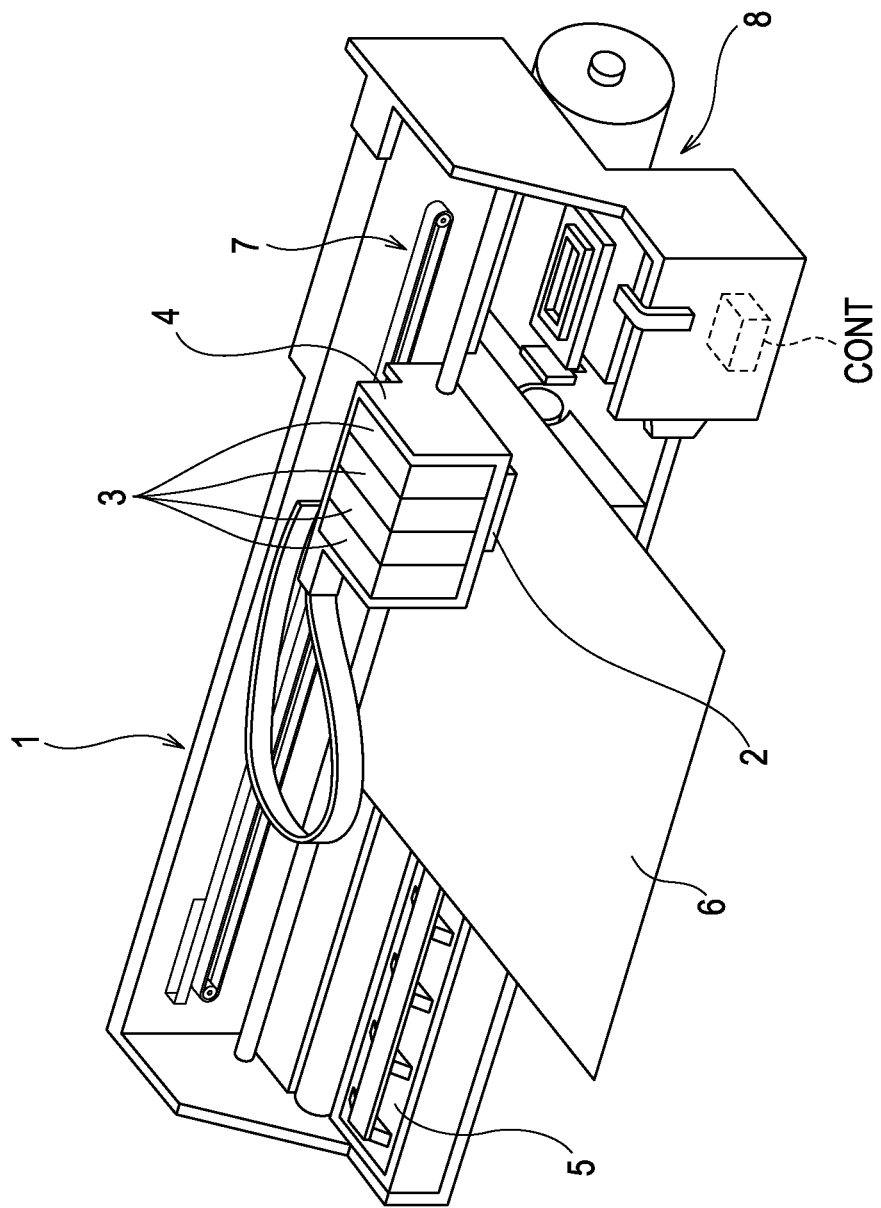
FIG. 1 is a perspective view schematically illustrating a configuration of a printer according to an embodiment of the invention.

Hereinafter, preferred embodiments of the invention will be described. The embodiments described below are merely examples of the invention. In addition, the present invention is not limited to the following embodiments and includes various kinds of modification examples which are modified within a range not departing from the concept of the invention.

1. Non-Aqueous Cleaning Liquid

A non-aqueous cleaning liquid according to an embodiment of the invention includes a pigment and an organic solvent. In an ink jet recording apparatus including an ink flow path, through which a non-aqueous ink is circulated, the non-aqueous cleaning liquid is used for cleaning the ink flow path. In the embodiment, "non-aqueous" of the non-aqueous cleaning liquid represents that water is not intentionally added for preparing the cleaning liquid, and the non-aqueous cleaning liquid may include a small amount of water which is inevitably mixed thereinto during preparation or storage of the cleaning liquid.

The non-aqueous cleaning liquid according to the embodiment fills a container composed of polyolefin to be used. The container composed of polyolefin retains or stores the non-aqueous cleaning liquid and is not particularly limited as long as a member thereof in contact with the non-aqueous cleaning liquid is formed from a material containing polyolefin. Examples of the polyolefin include polyethylene and polypropylene. Specific examples of the container composed of polyolefin include ink packs disclosed in JP-A-2004-276991 and JP-A-2004-306466.

Hereinafter, components included in the non-aqueous cleaning liquid according to the embodiment will be described in detail.

1.1 Pigment

The non-aqueous cleaning liquid according to the embodiment contains a pigment. A mechanism is not clear, but the inventors found as a result of diligent studies that, by adding a pigment to a non-aqueous cleaning liquid, which includes an organic solvent as a main solvent, an action of the organic solvent which dissolves polyolefin can be suppressed.

As the non-aqueous cleaning liquid, pigments including inorganic pigments and organic pigments which are generally used for a non-aqueous ink composition of the related art can be used. These pigments may be used alone or in a combination of two or more kinds.

Examples of the organic pigments include azo pigments (for example, azo lakes, insoluble azo pigments, condensed azo pigments, chelated azo pigments), polycyclic pigments (for example, phthalocyanine pigments, perylene and perylene-based pigments, anthraquinone pigments, quinacridone pigments, dioxazine pigments, thioindigo pigments, isoindolinone pigments, quinophthalone pigments), lake dyes (for example, basic dye lakes, acidic dye lakes), nitro pigments, nitroso pigments, aniline black, and daylight fluorescent pigments. In addition, examples of the inorganic pigments include carbon black, titanium dioxide, silica, and alumina.

Examples of magenta or red organic pigments include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, and C.I. Pigment Red 224.

Examples of orange or yellow organic pigments include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, and C.I. Pigment Yellow 180.

Examples of green or cyan organic pigments include C.I. Pigment Blue 15, C.I. Pigment Blue 15:2, C.I. Pigment Blue 15:3, C.I. Pigment Blue 16, C.I. Pigment Blue 60, C.I. Pigment Green 7, and C.I. Pigment Green 36.

Examples of black inorganic pigments include carbon black.

As the pigment included in the non-aqueous cleaning liquid according to the embodiment, an organic pigment is preferable. The dispersibility of the organic pigment in the non-aqueous cleaning liquid is superior to that of an inorganic pigment. Therefore, it is considered that, as compared to the inorganic pigment, the organic pigment can be distributed more uniformly in the container filled with the non-aqueous cleaning liquid and thus an action of the organic solvent which dissolves polyolefin is further suppressed.

A content of the pigment is preferably 0.001% by mass to 0.5% by mass, more preferably 0.005% by mass to 0.5% by mass, and still more preferably 0.01% by mass to 0.1% by mass, with respect to the total mass of the non-aqueous cleaning liquid. When the content of the pigment is in the above-described range, especially, does not fall below the lower limit, the dissolving of polyolefin in the organic solvent can be further suppressed. When the content of the pigment is in the above-described range, especially, does not exceed the upper limit, an amount of a non-aqueous ink used can be reduced at the time of replacing the non-aqueous cleaning liquid in an ink flow path.

An average particle size (d50) of the pigment is preferably 10 nm to 500 nm, more preferably 50 nm to 400 nm, and still more preferably 100 nm to 300 nm. When the average particle size (d50) of the pigment is in the above-described range, the dispersibility of the pigment in the non-aqueous cleaning liquid is further improved. As a result, an action of the organic solvent dissolving polyolefin, which is used as a material of the container, may be further suppressed.

"The average particle size (d50)" described in the embodiment represents a particle size measured when a cumulative existence probability of particles is 50% in a case where a particle size distribution in terms of number is measured using a particle size distribution analyzer according to a laser diffraction/scattering method. Examples of the laser diffraction particle size distribution analyzer include Nanotrac (manufactured by Microtrac Inc., Model No. "UPA-150").

1.2 Organic Solvent

The non-aqueous cleaning liquid according to the embodiment contains an organic solvent. The organic solvent used for the non-aqueous cleaning liquid is not particularly limited, and the same organic solvent as that included in a non-aqueous ink can be preferably used. It is preferable that the organic solvent included in the non-aqueous cleaning liquid be the same as that included in the non-aqueous ink, from the viewpoint of efficiently replacing the non-aqueous cleaning liquid and the non-aqueous ink.

Examples of the organic solvent included in the non-aqueous cleaning liquid include alkylene glycol ethers and lactones which are liquid at normal temperature and normal pressure.

Examples of the alkylene glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

As the lactones, lactones having 6 or less carbon atoms are preferable, and examples thereof include β-propiolactone, β-butyrolactone, γ-butyrolactone, γ-valerolactone, and ε-caprolactone.

In addition, the non-aqueous cleaning liquid according to the embodiment may further contain the following examples of organic solvents in addition to the above-described organic solvents.

As other organic solvents, organic polar solvents are preferable, and examples thereof include alcohols (for example, methyl alcohol, ethyl alcohol, propyl alcohol, butyl alcohol, and fluoroalcohols), ketones (for example, acetone, methyl ethyl ketone, and cyclohexanone), carboxylic acid esters (for example, methyl acetate, ethyl acetate, propyl acetate, butyl acetate, methyl propionate, and ethyl propionate), and ethers (for example, diethyl ether, dipropyl ether, tetrahydrofuran, and dioxane).

A content of the organic solvent is preferably 90% by mass to 99.5% by mass with respect to the total mass of the non-aqueous cleaning liquid.

1.3 Other Components

The non-aqueous cleaning liquid according to the embodiment may further contain components included in a general non-aqueous ink in addition to the pigment and the organic solvent, from the viewpoint of improving performance of the non-aqueous cleaning liquid. Examples of such components include a surfactant, a dispersant, a preservative, a fungicide, an antioxidant, and a pH adjuster.

The surfactant can be used from the viewpoints of improving the wettability of the non-aqueous cleaning liquid on an ink flow path and improving a cleaning property of an ink flow path. Such a surfactant is not particularly limited, and examples thereof include silicone surfactants, fluorine-based surfactants, and polyoxyethylene derivatives as nonionic surfactants.

As the silicone surfactants, polyester-modified silicone and polyether-modified silicone are preferably used. Specific examples thereof include BYK-347 and 348; and BYK-UV3500, 3510, 3530, and 3570 (all of which are manufactured by BYK Japan K.K.).

As the fluorine-based surfactants, fluorine-modified polymers are preferably used, and specific examples thereof include BYK-340 (manufactured by BYK Japan K.K.).

In addition, as the polyoxyethylene derivatives, acetylene glycol surfactants are preferably used. Specific examples thereof include Surfynol 82, 104, 465, 485, and TG (all of which are manufactured by Air Products and Chemicals Inc.); Olfine STG and E1010 (all of which are manufactured by Nissin Chemical Co., Ltd.); Nissan Nonion A-10R and A-13R (all of which are manufactured by NOF Corporation); Flowlen TG-740W and D-90 (manufactured by Kyoeisha Chemical Co., Ltd.); and Noigen CX-100 (manufactured by Dai-ichi Kogyo Seiyaku Co., Ltd.).

The dispersant can be used from the viewpoint of improving the dispersion stability of the pigment. As such a dispersant, dispersants which are used in a general non-aqueous ink can be used. As the dispersant, a dispersant which effectively works when a dissolution parameter of the organic solvent is 8 to 11 is preferably used. Specific examples of such a dispersant include polyester polymers such as Hinoacto KF1-M, T-6000, T-7000, T-8000, T-8350P, and T-8000E (all of which are manufactured by Takefu Fine Chemical Corporation); Solsperse 20000, 24000, 32000, 32500, 33500, 34000, 35200, and 37500 (all of which are manufactured by Lubrizol Corporation); Disperbyk-161, 162, 163, 164, 166, 180, 190, 191, and 192 (all of which are manufactured by BYK Japan K.K.); Flowlen DOPA-17, 22, 33, and G-700 (all of which are manufactured Kyoeisha Chemical Co., Ltd.); Ajisper-PB821 and PB711 (all of which are manufactured by Ajinomoto Co., Inc.); and LP4010, LP4050, LP4055, and POLYMER 400, 401, 402, 403, 450, 451, and 453 (all of which are manufactured by EFKA chemicals B.V.).

Examples of the preservative and the fungicide include sodium benzoate, sodium pentachlorophenol, sodium 2-pyridinethiol-1-oxide, sodium sorbate, sodium dehydroacetate, and 1,2-dibenzisothiazolin-3-one (for example, Proxel CRL, Proxel BDN, Proxel GXL, Proxel XL-2, and Proxel TN, all of which are manufactured by Imperial Chemical Industries Ltd.).

Examples of the pH adjuster, a dissolution aid, or the antioxidant include amines and modified products such as diethanolamine, triethanolamine, propanolamine and morpholine; inorganic salts such as potassium hydroxide, sodium hydroxide and lithium hydroxide; ammonium hydroxide and quaternary ammonium hydroxides (such as tetramethylammonium); carbonates such as potassium carbonate, sodium carbonate, and lithium carbonate, and phosphates; N-methyl-2-pyrrolidone; ureas such as urea, thiourea and tetramethyl urea; allophanates such as allophanate and methylallophanate; biurets such as biuret, dimethylbiuret and tetramethylbiuret; and L-ascorbic acid and salts thereof.

1.4 Physical Properties of Non-Aqueous Cleaning Liquid

In the non-aqueous cleaning liquid according to the embodiment, in order to easily discharge the non-aqueous cleaning liquid from a nozzle opening of an ink jet recording head after cleaning an ink flow path, a viscosity thereof at 20° C. is preferably 2 mPa·s to 15 mPa·s and more preferably 2 mPa·s to 10 mPa·s.

The viscosity can be measured with a viscoelasticity testing machine MCR-300 (manufactured by Anton Paar GmbH) by increasing a shear rate in a range of 10 to 1000 and measuring a viscosity at a shear rate of 200 at 20° C.

1.5 Method of Preparing Non-Aqueous Cleaning Liquid

The non-aqueous cleaning liquid according to the embodiment can be prepared by dispersing and mixing the above-described respective components with an appropriate method. After the above-described respective components are sufficiently stirred, the resultant is filtered to remove coarse particles and foreign materials, which causes clogging. As a result, a desired non-aqueous cleaning liquid can be obtained.

2. Non-Aqueous Ink

As non-aqueous ink according to the embodiment, a non-aqueous ink, which is generally used for an ink jet recording apparatus, can be used. In the embodiment, "non-aqueous" of the non-aqueous ink represents that water is not intentionally added for preparing the ink, and the non-aqueous ink may include a small amount of water which is inevitably mixed thereinto during preparation or storage of the ink.

Hereinafter, components included in the non-aqueous ink according to the embodiment will be described.

2.1 Pigment

The non-aqueous ink according to the embodiment contains a pigment. Since the same components as the examples described above in the non-aqueous cleaning liquid can be used as the pigment, the description thereof will not be repeated.

A content of the pigment in the non-aqueous ink composition according to the embodiment can be appropriately selected according to its application and printing characteristics, but is preferably 1.0% by mass to 25% by mass, more preferably 1% by mass to 15% by mass, and still more preferably 1% by mass to 10% by mass, with respect to the total mass of the non-aqueous ink composition.

2.2 Organic Solvent

The non-aqueous ink according to the embodiment contains an organic solvent. Since the same components as the examples described above in the non-aqueous cleaning liquid can be used as the organic solvent, the description thereof will not be repeated.

2.3 Other Components

The non-aqueous ink according to the embodiment may contain components which are usually included in a non-aqueous ink. Since the same components as the examples (surfactant, dispersant, preservative, fungicide, antioxidant, and pH adjuster) described in the non-aqueous cleaning liquid can be used as such components, the descriptions thereof will not repeated.

In addition to the above-described components, in order to adjust the viscosity of the ink, a binder resin may be added to the non-aqueous ink according to the embodiment. Examples of the binder resin include acrylic resins, styrene acrylic resins, rosin-modified resins, phenol resins, terpene resins, polyester resins, polyamide resins, epoxy resins, vinyl chloride-vinyl acetate copolymer resins, fibrous resins such as cellulose acetate butyrate, and vinyl toluene-α-methyl styrene copolymer resins. As the binder resin, the above examples may be used alone or in a combination of two or more kinds. The binder resin can further improve the fixing property of the ink to a recording medium depending on an amount thereof added.

2.4 Physical Properties of Non-Aqueous Ink

In the non-aqueous ink according to the embodiment, a surface tension at 20° C. is preferably 20 mN/m to 50 mN/m and more preferably 25 mN/m to 40 mN/m from the viewpoints of recording quality and reliability and balance as an ink jet ink. The surface tension can be measured with an automatic surface tensiometer CBVP-Z (manufactured by Kyowa Interface Science Co., Ltd.) by measuring a surface tension when the ink wets a platinum plate at 20° C.

In addition, from the same viewpoints, a viscosity at 20° C. of the non-aqueous ink according to the embodiment is preferably 2 mPa·s to 15 mPa·s and more preferably 2 mPa·s to 10 mPa·s. The viscosity can be measured with a viscoelasticity testing machine MCR-300 (manufactured by Anton Paar GmbH) by increasing a shear rate in a range of 10 to 1000 and measuring a viscosity at a shear rate of 200 at 20° C.

2.5 Manufacturing Method of Non-Aqueous Ink

The non-aqueous ink according to the embodiment can be manufactured with a well-known method. When the pigment is used as a colorant, a pigment, a dispersant, and an organic solvent (a part thereof) are mixed first, followed by dispersion with a ball mill, a bead mill, ultrasonic waves, a jet mill, or the like to prepare a pigment dispersion. The pigment dispersion is adjusted so as to have desired ink characteristics. Next, the organic solvent (the balance) and other additives (for examples, a surfactant and a binder resin) are added thereto under stirring to obtain a non-aqueous ink.

3. Ink Jet Recording Apparatus

In an ink jet recording apparatus including an ink flow path through which a non-aqueous ink is circulated, the above-described non-aqueous cleaning liquid is used for cleaning the ink flow path. Hereinafter, an ink jet recording apparatus to which the non-aqueous ink according to the embodiment is applied will be described.

As the ink jet recording apparatus to which the non-aqueous ink according to the embodiment is applied, a well-known ink jet printer of the related art can be used. As the ink jet printer, for example, an ink jet printer (hereinafter, simply referred to as "a printer") illustrated in FIG. 1 may be used as an example.

FIG. 1 is a perspective view illustrating a configuration of a printer 1 according to an embodiment of the invention. As illustrated in FIG. 1, the printer 1 includes an ink jet recording head 2 mounted thereto; a carriage 4 to which an ink cartridge 3 is detachably mounted; a platen 5 which is disposed below the ink jet recording head 2 and transports a recording medium 6; a carriage moving mechanism 7 which moves the carriage 4 in a width direction (main scanning direction S) of the recording medium 6, and a medium feeding mechanism 8 which feeds the recording medium 6 in a medium-feeding direction. In addition, the printer 1 includes a controller CONT which controls the overall operation of the printer 1.

The ink cartridge 3 includes plural independent cartridges, and each cartridge is filled with the above-described non-aqueous ink or non-aqueous cleaning liquid. A cartridge filled with the non-aqueous cleaning liquid is not necessarily mounted onto the carriage 4 during normal printing and only needs to be mounted onto the carriage 4 when cleaning an ink flow path.

As the printer 1 according to the embodiment, a so-called on-carriage type printer in which the ink cartridge 3 is mounted onto the carriage 4 has been described as an example, but the printer is not limited thereto. For example, a so-called off-carriage type printer may be used in which a container (for example, an ink pack or an ink cartridge) filled with the non-aqueous ink or the non-aqueous cleaning liquid is mounted onto a case or the like of the printer 1 and the non-aqueous ink or the non-aqueous cleaning liquid is supplied to the ink jet recording head 2 through an ink supply tube.

Figure 2:
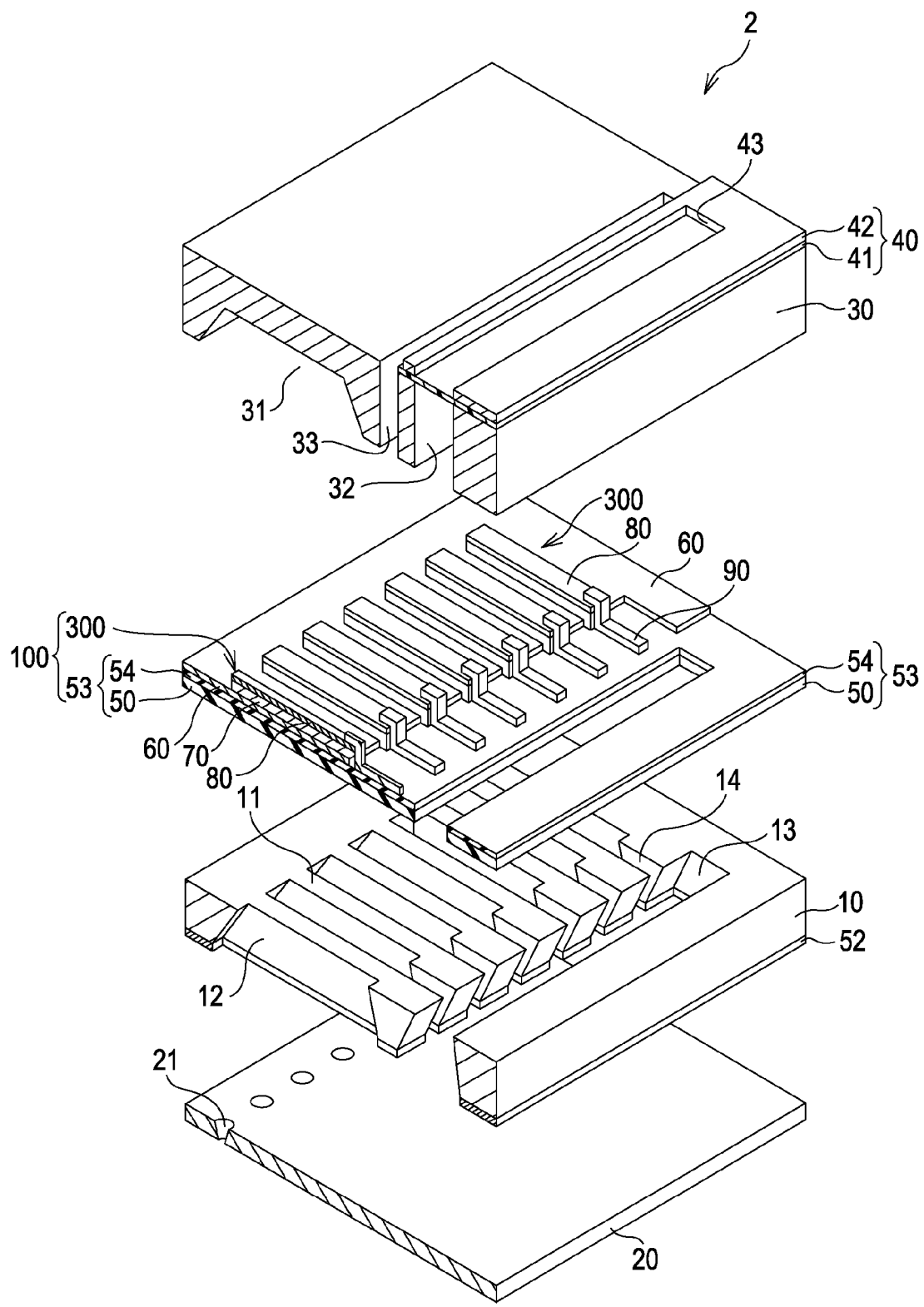
FIG. 2 is an exploded perspective view illustrating parts of an ink jet recording head according to an embodiment of the invention.
Figure 3A:
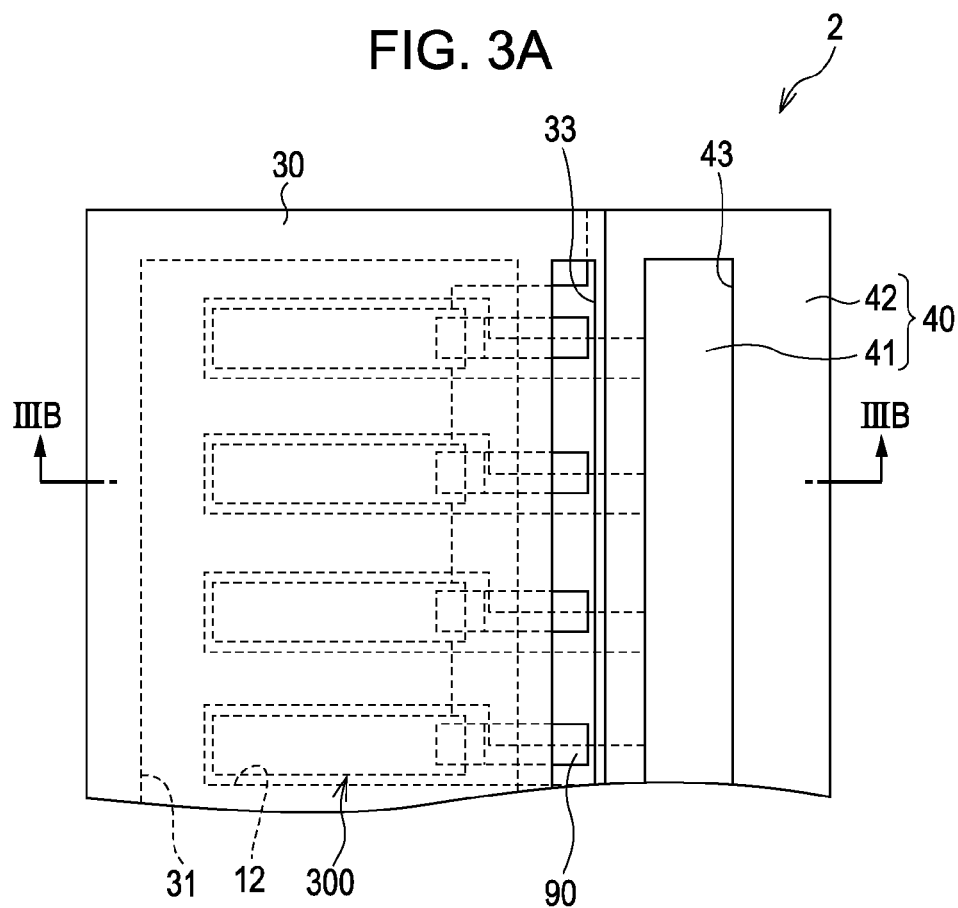
FIGS. 3A and 3B are respectively a plan view and a cross-sectional view illustrating parts of an ink jet recording head according to an embodiment of the invention.
Figure 3B:
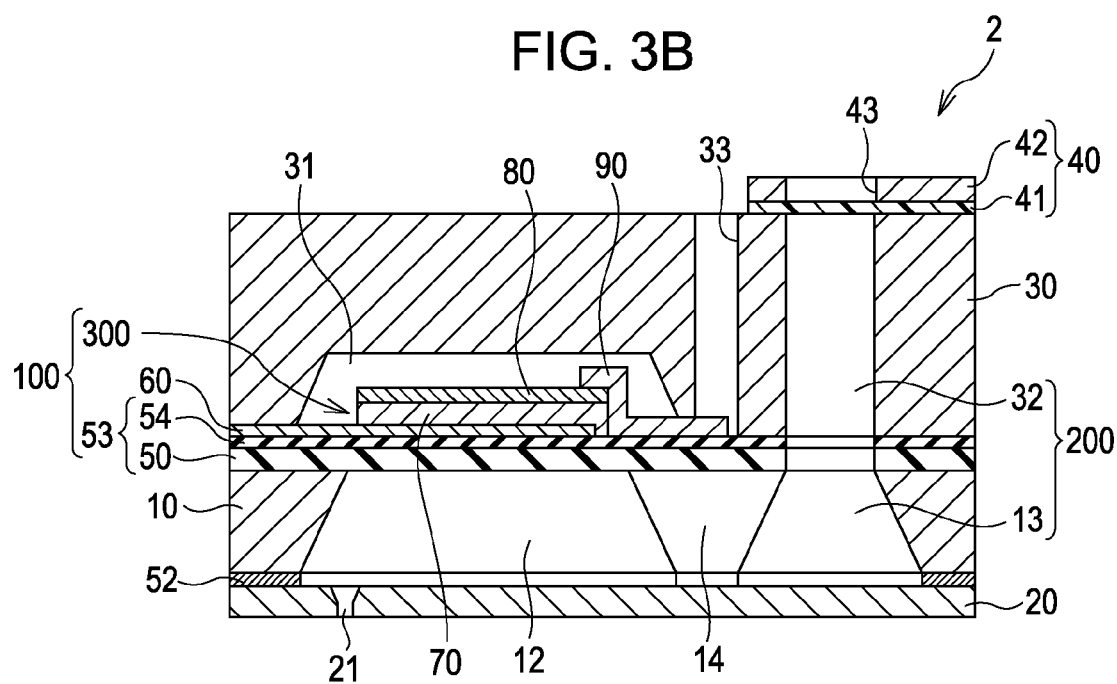

FIG. 2 is an exploded perspective view schematically illustrating parts of an ink jet recording head 2 according to an embodiment of the invention. FIG. 3A is a plan view illustrating parts of the ink jet recording head 2 and FIG. 3B is a cross-sectional view taken along line IIIB-IIIB of FIG. 3A.

In FIGS. 2 and 3, the ink jet recording head 2 includes a flow path forming substrate 10, a nozzle plate 20, and a protective substrate 30. The ink jet recording head 2 is assembled by interposing the flow path forming substrate 10 between the nozzle plate 20 and the protective substrate 30.

The flow path forming substrate 10 is configured as a silicon single crystal substrate having a plane orientation (110), and on one surface thereof, an elastic film 50 is formed in advance through thermal oxidation.

In the flow path forming substrate 10, plural pressure generating chambers 12 which are partitioned by partition walls 11 are disposed in parallel. In addition, a communication portion 13 is formed in a region outside the pressure generating chambers 12 of the flow path forming substrate 10 in a longitudinal direction thereof. The communication portion 13 and each of the pressure generating chambers 12 communicate each other through an ink supply path 14 which is provided for each of the pressure generating chambers 12.

The communication portion 13 communicates with the protective substrate 30 and configures a part of a manifold 200 which is an ink chamber shared by the pressure generating chambers 12. The ink supply paths 14 is formed to have a narrower width than that of the pressure generating chambers 12 to maintain a flow path resistance of ink flowing from the communication portion 13 to the pressure generating chambers 12 at a given level.

To an opening side of the flow path forming substrate 10, the nozzle plate 20, which has a nozzle opening 21 communicating with the vicinity of the opposite side to the ink supply path 14 of each of the pressure generating chambers 12, is fixed through a mask film 52 using an adhesive, a thermal bonding film, or the like. The nozzle plate 20 is formed from, for example, glass ceramics, silicon single crystal, or stainless steel.

On the other hand, on the opposite side to the opening of the flow path forming substrate 10, a piezoelectric actuator 100 is provided. The piezoelectric actuator 100 includes a vibration plate 53 and a piezoelectric element 300 which is a driving unit.

The vibration plate 53 includes, for example, the elastic film 50 having a thickness of about 1.0 μm and an insulating film 54 which is formed from zirconium oxide on the elastic film 50 and has a thickness of about 0.35 μm.

The piezoelectric element 300 is formed in a region opposite the pressure generating chambers 12 with the vibration plate 53 interposed therebetween.

On the insulating film 54, the piezoelectric element 300 is formed which includes a lower electrode 60 having a thickness of, for example, about 0.1 μm to 0.2 μm, a piezoelectric layer 70 having a thickness of, for example, about 0.5 μm to 5 μm, and an upper electrode 80 having a thickness of, for example, about 0.05 μm.

In general, one of the electrodes of the piezoelectric element 300 is configured as a common electrode, and the other electrode and the piezoelectric layer 70 are patterned for each of the pressure generating chambers 12. In this embodiment, the lower electrode 60 is configured as a common electrode of the piezoelectric element 300 and the upper electrode 80 is configured as an individual electrode of the piezoelectric element 300. However, these configurations may be reversed in consideration of circumstances of a drive circuit or wiring.

In addition, the piezoelectric actuator 100 includes a lead electrode 90. Each of the upper electrodes 80 of the piezoelectric elements 300 is connected to the lead electrode 90 formed from, for example, gold (Au). The voltage is selectively applied to each of the piezoelectric elements 300 through the lead electrode 90.

The protective substrate 30 which includes a piezoelectric element protecting portion 31 for protecting the piezoelectric element 300 is bonded to a region of the flow path forming substrate 10 opposite the piezoelectric element 300 with an adhesive or the like.

The piezoelectric element protecting portion 31 preferably has a space to a degree not interfering with the movement of the piezoelectric element 300, and this space may be sealed or not.

In addition, the protective substrate 30 is provided with a reservoir portion 32 in a region opposite the communication portion 13. This reservoir portion 32 communicates with the communication portion 13 of the flow path forming substrate 10 and configures the manifold 200 which is an ink chamber shared by the pressure generating chambers 12.

Furthermore, a through hole 33 penetrating the protective substrate 30 in a thickness direction thereof is provided in a region between the piezoelectric element protecting portion 31 of the protective substrate 30 and the manifold 200. Through this through hole 33, a part of the lower electrode 60 and a tip end of the lead electrode 90 are exposed. An end of a connection wiring which extends from a driver IC (not illustrated) is connected to the lower electrode 60 and the lead electrode 90.

The protective substrate 30 is preferably formed from a material having about the same thermal expansion as that of the flow path forming substrate 10, for example, glass, ceramic material, or silicon single crystal.

A compliance substrate 40 including a sealing film 41 and a fixing plate 42 is joined onto the protective substrate 30. The sealing film 41 is formed from a flexible material having a low rigidity, for example, polyphenylene sulfide (PPS) film having a thickness of, for example, 6 μm. One surface of the reservoir portion 32 is sealed by this sealing film 41.

In addition, the fixing plate 42 is formed from a rigid material such as metal, for example, stainless steel (SUS) having a thickness of 30 μm. Since a region of the fixing plate 42 opposite the manifold 200 is configured by an opening 43 which is completely perforated in a thickness direction thereof, one surface of the manifold 200 is sealed with only the flexible sealing film 41.

The ink jet recording head 2 suctions ink from an ink supply unit, fills the inside ranging from the manifold 200 to the nozzle opening 21 with the ink, and applies voltage between the lower electrode 60 and the upper electrode 80 corresponding to each of the pressure generating chambers 12 in response to a recording signal output from the driver IC. With the application of voltage, the elastic film 50 and the piezoelectric layer 70 are bent, the pressure inside each of the pressure generating chambers 12 increases, and ink droplets are discharged from the nozzle opening 21.

The ink flow path described in the embodiment represents a portion in contact with ink in an ink jet recording apparatus. Specifically, examples of the ink flow path in the printer 1 include a flow path (not illustrated) for connecting the ink cartridge 3 and the ink jet recording head 2; and the manifold 200, the ink supply path 14, the pressure generating chambers 12, and the nozzle opening 21 which are provided inside the ink jet recording head 2.

The ink flow path of the ink jet recording apparatus according to the embodiment includes a region which has a cross-sectional surface area of 100 μm$^2$ to 1000 μm$^2$ perpendicular to a circulation direction of the non-aqueous ink. Examples of such a region include the ink supply path 14 and the nozzle opening 21.

The ink supply path 14 may have a quadrilateral shape in a cross-section perpendicular to the circulation direction of the non-aqueous ink. The length of a shortest side of the quadrilateral shape may be 15 μm to 25 μm. Examples of the quadrilateral shape include a rectangular shape, a square shape, a trapezoidal shape, and a parallelogram shape. In addition, "the shortest side of the quadrilateral shape" represents, for example, a short side of a rectangular shape.

The diameter of the nozzle opening 21 is preferably 15 μm to 25 μm. Examples of a shape of the nozzle opening include a column shape, a circular truncated cone shape, and a combination thereof. The shape in a cross-section perpendicular to the circulation direction of the non-aqueous ink may be circular.

Even when the ink flow path (ink supply path) is narrow or when the diameter of the nozzle opening is small as described above, if the above-described non-aqueous cleaning liquid is used, it is difficult for failures such as ink discharge failure to occur. That is, the above-described non-aqueous cleaning liquid can suppress foreign materials caused by a non-aqueous cleaning liquid. As a result, the failures such as ink discharge failure caused by a non-aqueous cleaning liquid can be reduced. Therefore, the non-aqueous cleaning liquid according to the embodiment can be preferably used for an ink jet recording apparatus including a narrow ink flow path.

4. Cleaning Method

A cleaning method according to the embodiment is to clean an ink flow path, through which a non-aqueous ink is circulated, with the above-described non-aqueous cleaning liquid in the above-described ink jet recording apparatus including the ink flow path.

Specifically, the ink flow path is cleaned by causing the non-aqueous cleaning liquid to flow into the ink flow path filled with the non-aqueous ink and replacing the non-aqueous ink in the ink flow path with the non-aqueous cleaning liquid. By doing so, foreign materials in the ink flow path are discharged from the nozzle opening along with the non-aqueous ink and thus the ink flow path can be cleaned.

When images are not being printed using the ink jet recording apparatus for a long period of time after the ink flow path is cleaned, a state where the ink flow path is filled with the non-aqueous cleaning liquid can be maintained. As a result, foreign materials caused by a non-aqueous ink can be suppressed.

On the other hand, when images are being printed using the ink jet recording apparatus, the ink flow path can be filled with the non-aqueous ink again by causing the non-aqueous ink to flow into the ink flow path filled with the non-aqueous cleaning liquid and discharging the non-aqueous cleaning liquid from the nozzle opening.

The cleaning method according to the embodiment uses the above-described non-aqueous cleaning liquid. Therefore, defects such as nozzle clogging caused by a non-aqueous cleaning liquid can be suppressed and a cleaning property of the ink flow path through which the non-aqueous ink is circulated is excellent.

5. EXAMPLES

Hereinafter, the embodiments of the present invention will be described more specifically using Examples and Comparative Examples, but the embodiments are not limited to these Examples.

5.1 Preparation of Non-Aqueous Ink

An amount of solvent corresponding to a concentration shown in Table 1 was put into a container, followed by mixing and stirring with a magnetic stirrer for 30 minutes to obtain a mixed solvent. A part of the obtained mixed solution was separated and a predetermined amount of Solsperse 37500 (manufactured by Lubrizol Corporation, trade name) and a predetermined amount of pigment were added thereto, followed by pulverizing with a homogenizer. Next, the resultant was dispersed with a bead mill filled with zirconia beads having a diameter of 0.3 mm to obtain a pigment dispersion. The balance of the mixed solvent and BYK-340 (manufactured by BYK JAPAN K.K., fluorine-based surfactant) were further added to the obtained pigment dispersion, followed by mixing and stirring for 1 hour. Then, the resultant was filtered with a PTFE membrane filter of 5 μm. As a result, the respective ink compositions shown in Table 1 were obtained. Numerical values in the table are represented by % by mass.

Materials used in the table are as follows.
  C.I. Pigment Yellow 180 (manufactured by Clariant Japan K.K., trade name: "PV FAST YELLOW HG", yellow pigment)
  C.I. Pigment Red 122 (manufactured by TOYOCHEM Co., Ltd., trade name: "LIONOGEN MAGENTA R", magenta pigment)
  C.I. Pigment Blue 15:3 (manufactured by Dainichiseika Color & Chemicals Mfg. Co., Ltd., trade name: "CYANINE BLUE 4920", cyan pigment)
  C.I. Pigment Black 7 (manufactured by Mitsubishi Chemical Corporation, trade name: "MA-7", black pigment)
  Solsperse 37500 (trade name, manufactured by Lubrizol Corporation, dispersant)
  γ-Butyrolactone (manufactured by KANTO CHEMICAL Co., Inc., solvent)
  Diethylene glycol diethyl ether (trade name, manufactured by Nippon Nyukazai Co., Ltd., solvent)
  Diethylene glycol ethyl methyl ether (trade name, manufactured by Nippon Nyukazai Co., Ltd., solvent)
  BYK-340 (trade name, manufactured by BYK JAPAN K.K., fluorine-based surfactant)

TABLE 1

| Composition of Non-Aqueous Ink | | Y1 | M1 | C1 | Bk1 |
|---|---|---|---|---|---|
| Pigment | C.I. Pigment Yellow 180 | 4 | | | |
| | C.I. Pigment Red 122 | | 5 | | |
| | C.I. Pigment Blue 15:3 | | | 3.7 | |
| | C.I. Pigment Black 7 | | | | 4.4 |
| Dispersant | Solsperse 37500 | 4 | 4 | 4 | 4 |
| Organic Solvent | γ-Butyrolactone | 10 | 10 | 10 | 10 |
| | Diethylene Glycol Ethyl Methyl Ether | 50 | 50 | 50 | 50 |
| | Diethylene Glycol Diethyl Ether | 30 | 29 | 30.3 | 29.6 |
| Surfactant | BYK-340 | 2 | 2 | 2 | 2 |
| Total Amount (% By Mass) | | 100 | 100 | 100 | 100 |

5.2 Preparation of Non-Aqueous Cleaning Liquid

According to compositions shown in Table 2, the respective components were mixed and stirred, followed by filtration with a membrane filter of 10 μm to prepare non-aqueous cleaning liquids S1 to S10. The respective components shown in Table 2 are as follows.

Pigments
  Y pigment (yellow organic pigment, Pigment Yellow 155, average particle size: 260 nm)

M pigment (magenta organic pigment, Pigment Red 122, average particle size: 210 nm)

C pigment (cyan organic pigment, Pigment blue 15:3, average particle size: 180 nm)

Bk pigment (black inorganic pigment, carbon black, manufactured by Mitsubishi Chemical Corporation, average particle size: 130 nm)

TR92 (white inorganic pigment, titanium dioxide, manufactured by Tioxide Corporation, average particle size: 240 nm)

AEROSIL R972 (inorganic pigment, hydrophobic fumed silica, manufactured by Nippon Aerosil Co., Ltd., average particle size: 16 nm)

Organic Solvents

γ-Butyrolactone (manufactured by KANTO CHEMICAL Co., Inc.)

Diethylene glycol ethyl methyl ether (manufactured by Nippon Nyukazai Co., Ltd.)

Diethylene glycol diethyl ether (manufactured by Nippon Nyukazai Co., Ltd.)

5.3 Evaluation Tests 5.3.1. Test for Foreign Materials

An ink pack (the inside which is a surface in contact with liquid is formed from polyethylene film and the outside which is a surface in non-contact with liquid is formed from aluminum deposited film) was filled with the above-described non-aqueous cleaning liquid and was left to stand at a temperature of 20° C. for 5 days. Then, the non-aqueous cleaning liquid in the ink pack was poured out and whether there were foreign materials or not was examined by visual inspection.

The evaluation criteria were as follows and the evaluation results are shown in Table 3.

A: Foreign materials were not observed

B: A small amount of foreign materials were observed

C: A large amount of foreign materials were observed 5.3.2. Test for Cleaning Property A dedicated cartridge of an ink jet printer GS 6000 (trade name, manufactured by Seiko Epson Corp.) was filled with the above-described non-aqueous ink and mounted to the ink jet printer. Then, an ink flow path of the ink jet printer was filled with the non-aqueous ink. Next, the non-aqueous cleaning liquid, which had been left to stand for 5 days in the description of "5.3.1. Test for foreign materials", was caused to flow into the ink flow path filled with the non-aqueous ink to discharge the non-aqueous ink from the nozzle opening and replace the non-aqueous ink in the ink flow path with the non-aqueous cleaning liquid. Next, the non-aqueous ink was caused to flow into the ink flow path filled with the non-aqueous cleaning liquid again to discharge the non-aqueous cleaning liquid from the nozzle opening and replace the non-aqueous cleaning liquid in the ink flow path with the non-aqueous ink. Then, the non-aqueous ink was discharged from the nozzle opening of the ink jet printer to print a nozzle pattern on a recording medium (trade name: "IJ-40", manufactured by 3M company).

When the non-aqueous ink in the ink flow path was replaced with the non-aqueous cleaning liquid, an amount of the non-aqueous cleaning liquid used was made the same as a volume of the ink flow path.

On the other hand, when the non-aqueous cleaning liquid in the ink flow path was replaced with the non-aqueous ink, the non-aqueous ink was caused to flow into the ink flow path such that the composition of the non-aqueous cleaning liquid discharged from the nozzle opening was the same as that of the non-aqueous ink used for the replacement.

The evaluation criteria were as follows and the evaluation results are shown in Table 3.

A: Ink discharge failure was not observed in a printed pattern

B: Ink discharge failure was observed in a printed pattern 5.3.3 Evaluation Results The results of the evaluation tests are shown in Table 3.

TABLE 2

| Composition of Non-Aqueous Cleaning liquid | | S1 | S2 | S3 | S4 | S5 | S6 | S7 | S8 | S9 | S10 |
|---|---|---|---|---|---|---|---|---|---|---|---|
| Pigment | Y Pigment | 0.005 | 0.01 | 0.1 | | | | 0.5 | | | |
| | M pigment | | | | 0.01 | | | | | | |
| | C pigment | | | | | 0.01 | | | | | |
| | Bk pigment | | | | | | 0.01 | | | | |
| | TR92 | | | | | | | | | 0.01 | |
| | AEROSIL R972 | | | | | | | | | | 0.01 |
| Organic Solvent | γ-Butyrolactone | 10 | 10 | 10 | 10 | 10 | 10 | 10 | 10 | 10 | 10 |
| | Diethylene Glycol Ethyl Methyl Ether | 20 | 20 | 20 | 20 | 20 | 20 | 20 | 20 | 20 | 20 |
| | Diethylene Glycol Diethyl Ether | Balance | Balance | Balance | Balance | Balance | Balance | Balance | Balance | Balance | Balance |
| Total Amount (% By Mass) | | 100 | 100 | 100 | 100 | 100 | 100 | 100 | 100 | 100 | 100 |
| Kind of Pigment | | Organic | Organic | Organic | Organic | Organic | Inorganic | Organic | — | Inorganic | Inorganic |
| Particle Size of Pigment | | 260 | 260 | 260 | 210 | 180 | 130 | 260 | — | 240 | 16 |

TABLE 3

| | | Example 1 | Example 2 | Example 3 | Example 4 | Example 5 | Example 6 | Example 7 | Comparative Example 1 | Example 8 | Example 9 |
|---|---|---|---|---|---|---|---|---|---|---|---|
| Kind of cleaning liquid | | S1 | S2 | S3 | S4 | S5 | S6 | S7 | S8 | S9 | S10 |
| Evaluation Test | Foreign Materials | B | A | A | A | A | B | A | C | B | B |
| | Cleaning Property | A | A | A | A | A | A | A | B | A | A |

Examples 1 to 9 shows that, by using the non-aqueous cleaning liquid containing the pigment and the organic solvent, foreign materials in the ink pack are suppressed and a cleaning property of the ink flow path is superior (nozzle clogging of ink does not occur).

When the non-aqueous cleaning liquid S1 was used, a small amount of foreign materials was observed in the ink pack as shown in the evaluation result of Example 1 of "5.3.1. Test for foreign materials". Accordingly, it can be seen that, when a content of the pigment included in the cleaning liquid is reduced, an amount of foreign materials increases. However, as shown in the evaluation result of Example 1 of "5.3.2. Test for Cleaning Property", even when the non-aqueous cleaning liquid S1 was used, a deterioration in the cleaning property of the ink flow path was not observed. Therefore, it can be said that the more a cleaning property of the ink flow path deteriorates, the less an amount of foreign materials are generated.

When the non-aqueous cleaning liquid S6 was used, a small amount of foreign materials was observed in the ink pack as shown in the evaluation result of Example 6 of "5.3.1. Test for foreign materials". Accordingly, it can be seen that, when an inorganic pigment is used, an amount of foreign materials increases as compared to a case where an organic pigment is used. However, as shown in the evaluation result of Example 6 of "5.3.2. Test for Cleaning Property", even when the non-aqueous cleaning liquid S6 was used, a deterioration in the cleaning property of the ink flow path was not observed. Therefore, it can be said that the more a cleaning property of the ink flow path deteriorates, the less an amount of foreign materials generated.

In "5.3.2. Test for Cleaning Property", when the non-aqueous cleaning liquid S7 in the ink flow path was replaced with the non-aqueous ink, it was necessary that a larger amount of the non-aqueous ink than that of a case of using the other non-aqueous cleaning liquids be used.

On the other hand, Comparative Example 1 shows that, when the non-aqueous cleaning liquid S8 not containing the pigment was used, a large amount of foreign materials were generated and the cleaning property deteriorated.

In "5.3.1. Test for foreign materials", it was found from analysis using an infrared spectrophotometer FT-IR (NICOLET6700 FT-IR, manufactured by Thermo Fisher Scientific K.K.) that foreign materials, generated when the non-aqueous cleaning liquids S1, S6, S8 were used, contained polyethylene as a main component.

The present invention is not limited to the above-described embodiments and various modifications can be made. For example, the present invention includes substantially the same configurations as the configurations described in the embodiments (for examples, configurations having the same functions, methods, and results, or configurations having the same objects and effects). In addition, the present invention includes configurations in which non-essential parts of the configurations described in the embodiments are changed. In addition, the present invention includes configurations capable of achieving the same effects or the same objects as those of the configurations described in the embodiments. In addition, the present invention includes configurations in which well-known techniques are added to the configurations described in the embodiments.

What is claimed is:

1. A non-aqueous cleaning liquid which is used for cleaning an ink flow path, through which a non-aqueous ink is circulated, in an ink jet recording apparatus including the ink flow path and with which a container composed of polyolefin is filled, the non-aqueous cleaning liquid comprising:
a pigment; and
an organic solvent,
wherein a content of the pigment is 0.001% by mass to 0.5% by mass.

2. The non-aqueous cleaning liquid according to claim 1, wherein an average particle size (d50) of the pigment is 10 nm to 500 nm.

3. A method of cleaning an ink flow path, through which a non-aqueous ink is circulated, in an ink jet recording apparatus including the ink flow path, the method comprising:
circulating the non-aqueous cleaning liquid according to claim 2 through the ink flow path,
wherein the ink flow path includes a region which has a cross-sectional surface area of 100 $\mu m^2$ to 1000 $\mu m^2$ perpendicular to a circulation direction of the non-aqueous ink.

4. The cleaning method according to claim 3, wherein the region is a nozzle opening, and the diameter of the nozzle opening is 15 $\mu m$ to 25 $\mu m$.

5. The cleaning method according to claim 3, wherein the region is an ink supply path which is a part of the ink flow path,
the ink supply path has a quadrilateral shape in a cross-section perpendicular to a circulation direction of the non-aqueous ink, and
the length of a shortest side of the quadrilateral shape is 15 $\mu m$ to 25 $\mu m$.

6. The non-aqueous cleaning liquid according to claim 1, wherein the pigment is an organic pigment.

7. A method of cleaning an ink flow path, through which a non-aqueous ink is circulated, in an ink jet recording apparatus including the ink flow path, the method comprising:
circulating the non-aqueous cleaning liquid according to claim 6 through the ink flow path,
wherein the ink flow path includes a region which has a cross-sectional surface area of 100 $\mu m^2$ to 1000 $\mu m^2$ perpendicular to a circulation direction of the non-aqueous ink.

8. The cleaning method according to claim 7, wherein the region is a nozzle opening, and the diameter of the nozzle opening is 15 $\mu m$ to 25 $\mu m$.

9. The cleaning method according to claim 7, wherein the region is an ink supply path which is a part of the ink flow path,
the ink supply path has a quadrilateral shape in a cross-section perpendicular to a circulation direction of the non-aqueous ink, and
the length of a shortest side of the quadrilateral shape is 15 $\mu m$ to 25 $\mu m$.

10. A method of cleaning an ink flow path, through which a non-aqueous ink is circulated, in an ink jet recording apparatus including the ink flow path, the method comprising:
circulating the non-aqueous cleaning liquid according to claim 1 through the ink flow path, wherein the ink flow path includes a region which has a cross-sectional surface area of 100 $\mu m^2$ to 1000 $\mu m^2$ perpendicular to a circulation direction of the non-aqueous ink.

11. The cleaning method according to claim 10, wherein the region is a nozzle opening, and the diameter of the nozzle opening is 15 $\mu m$ to 25 $\mu m$.

12. The cleaning method according to claim 10, wherein the region is an ink supply path which is a part of the ink flow path,
the ink supply path has a quadrilateral shape in a cross-section perpendicular to a circulation direction of the non-aqueous ink, and
the length of a shortest side of the quadrilateral shape is 15 $\mu m$ to 25 $\mu m$.

* * * * *